June 10, 1924.　　　　　　　　　　　　　　　　　　　1,497,355
L. A. CASEY
DIRIGIBLE HEADLIGHT CONSTRUCTION FOR MOTOR VEHICLES
Filed Sept. 19, 1923　　　2 Sheets-Sheet 1

Lewis A. Casey,
Inventor

Witnesses:

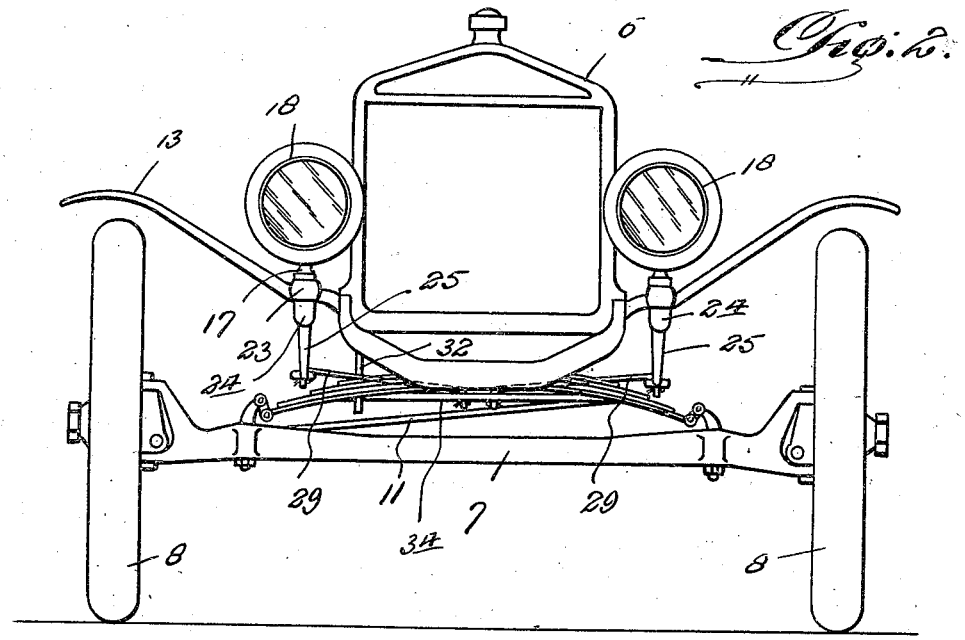
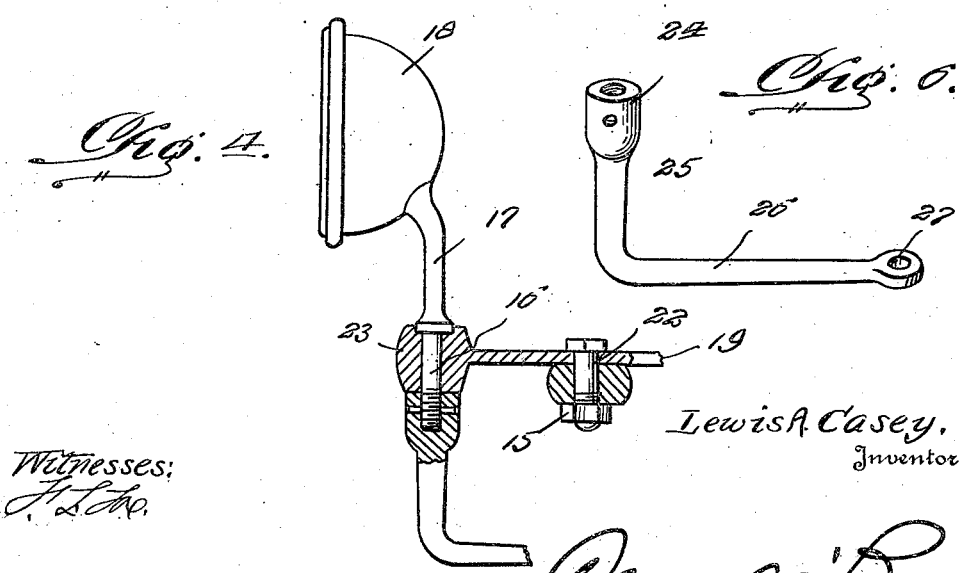

Patented June 10, 1924.

1,497,355

UNITED STATES PATENT OFFICE.

LEWIS A. CASEY, OF LEAKEY, TEXAS.

DIRIGIBLE HEADLIGHT CONSTRUCTION FOR MOTOR VEHICLES.

Application filed September 19, 1923. Serial No. 663,547.

*To all whom it may concern:*

Be it known that I, LEWIS A. CASEY, a citizen of the United States, residing at Leakey, in the county of Real and State of Texas, have invented certain new and useful Improvements in Dirigible Headlight Constructions for Motor Vehicles, of which the following is a specification.

In carrying out the present invention it is my purpose to provide a headlight construction for motor vehicles and particularly those of the Ford type wherein the usual headlights of the vehicle may be so mounted and so operatively connected to the steering mechanism of the motor vehicle as to move simultaneously therewith for directing the light rays from the vehicle in the path of travel of the vehicle at all times so as to enable the operator to see the road while making turns.

The primary object of my invention is to substantially improve and simplify devices of this general nature, my improved headlight construction being relatively simple of construction, efficient in operation, and one that may be associated with the Ford type of vehicle in a novel, simple and expeditious manner.

With the above and other objects in view, as the nature of the invention is better understood, the same comprises the novel form, combination and arrangement of parts set forth in the following detailed specification, shown in the accompanying drawings and claimed.

Figure 1:
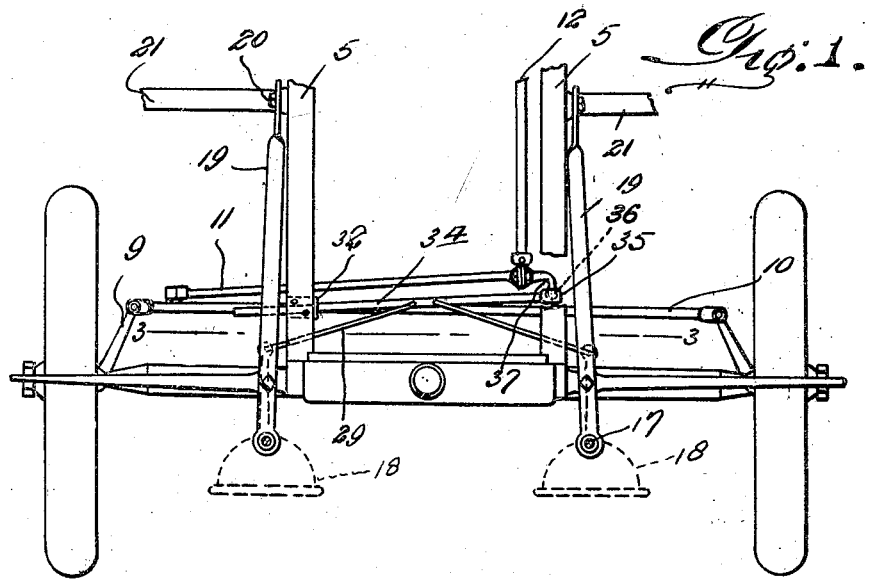
Figures 3, 7:
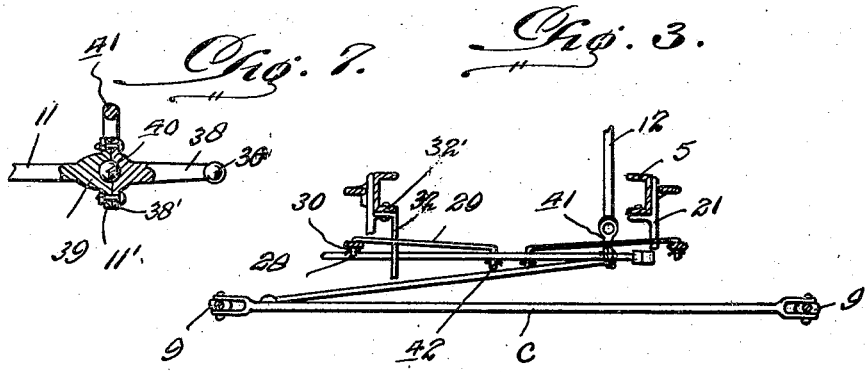
Figure 5:
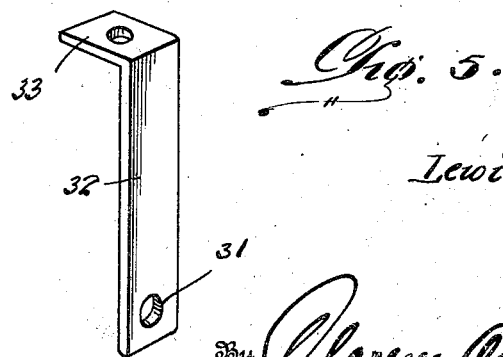

In the drawings wherein like reference characters indicate corresponding parts throughout the several views, Figure 1 is a fragmentary top plan view of the front end of a Ford automobile, certain parts removed, showing my improved headlight construction associated therewith, Figure 2 is a front elevational view of the vehicle, certain parts removed, shown as being equipped with my novel headlight construction, Figure 3 is a transverse detail cross section taken substantially upon the line 3—3 of Figure 1, Figure 4 is an enlarged vertical cross section taken through a portion of my headlight construction for more adequately disclosing the specific mounting of the vehicle headlight, Figure 5 is a perspective view of a rod guide that is employed for the purposes of guiding and supporting a rod element that includes a part of my invention, Figure 6 is a side elevational view of one of the connecting arms between one of the headlight posts, and a connecting member that is operatively controlled by the movement of the usual steering gear connecting rod of the vehicle steering mechanism, and Figure 7 is an enlarged fragmentary cross section through a portion of this dirigible headlight construction for more adequately disclosing the specific connection between the steering gear connecting rod and the steering post of the steering mechanism.

Now having particular reference to the drawings, there is fragmentarily shown a Ford type automobile that comprises the usual chassis bars 5—5, radiator 6, front axle 7, steering wheels 8, wheel spindles 9, spindle connecting rod 10, steering gear connecting rod 11, steering post 12, and fender braces 13 that are formed adjacent their connected ends with vertical openings within which is at present arranged the usual reduced and screw-threaded ends 16 of the posts 17 of the headlights 18. The elements just described are not of the essence of my invention, as the same are all found upon the Ford type automobile, it being however necessary for a more adequate disclosure of my invention to show the same in the drawings.

My invention per se embodies the provision of a pair of flat-like rod elements 19 that are twisted at their rear ends and mounted at 20 to the chassis bars 5—5 through the medium of the usual bolt connections for the running-board braces 21—21 of the vehicle. Adjacent the front ends these rods are formed with openings for registration with the before mentioned openings 15 in the fender braces 13 whereby the same may be bolted thereto through the medium of bolt and nut connections 22.

The front end of each rod 19 is formed with a collar 23 through which is extended the before mentioned reduced screw-threaded end of the respective headlight post 17 the rear end of the reduced portion of this post extending beneath said collar and being threaded within the internally screw-threaded socketed end 24 of the vertical portion 25 of a rearwardly extending arm 26, the opposite end of each of these arms being flattened and formed with an opening 27 through which is extended the downwardly bent end 28 of a rearwardly and inwardly extending rod 29. The downwardly bent end 28 of each of said rearwardly and inwardly extending arms 29 is maintained within the opening 27 of the respective connecting arm 26 through the medium of a cotter pin or other suitable means 30, Figure 3.

Slidably arranged within an opening 31 adjacent the lower end of a bracket plate 32 the upper end thereof being inturned at 33 and being bolted or otherwise suitably secured at 32' to the right hand chassis frame bar 5 is a relatively elongated bar 34 which is formed at its opposite end with a socketed head 35 within which is arranged the spherical head 36 upon the forwardly extending end 37 of a connecting arm 38, Figure 7. The opposite end of this connecting arm 38 is enlarged and is formed with a semi-circular socket for co-operating with a semi-circular socket upon the enlarged end 39 of the before mentioned steering gear connecting rod 11. The adjacent ends of said steering gear connecting rod 11 and said arm 38 are formed with mating flanges 11' and 38' respectively, that are bolted together as clearly shown in said Figure 7 for maintaining in position between said elements the headed ends 40 of the usual steering arm 41 upon the lower end of said steering post 12.

The inner ends of the before mentioned rod 29 are also downturned at 42 for engagement within spaced openings of the before mentioned sliding rod 34, these downturned ends being also maintained within said openings through the medium of cotter pins, Figure 3.

In view of the above description, it will be obvious that as the steering gear connecting rod 11 moves in opposite directions the rod 34 will also move in a similar direction for thereby actuating the rods 29—29, for rotating the headlight posts 17 within the collars 23 upon the front ends of said flat-like rod 19 and thereby directing the light rays from these headlights in the path of travel of the vehicle at all times.

I have herein shown and described that this improved dirigible headlight construction for motor vehicles consists of certain detailed structural elements. It is however nevertheless to be understood that departures may be made from the specific structure as shown without affecting the spirit and scope of the appended claims.

Having thus described my invention, what I claim as new and desire to secure by Letters Patent, is:—

1. In a dirigible headlight construction for vehicles, a pair of headlights supported for rotation at opposite sides of the vehicle radiator and relatively forwardly thereof, a rod, slidable within a bracket carried by one of the chassis bars of the vehicle, connections between the headlight posts and said rod, and means for operatively connecting said rod to the usual steering gear connecting rod of the vehicle.

2. In a dirigible headlight construction for motor vehicles, a pair of flat-like rods upon opposite sides of the vehicle radiator connected at their rear ends to the chassis bars of the vehicle and adjacent their forward ends to the usual fender braces of said vehicle, collars formed upon the front ends of said rods for receiving the usual posts of the vehicle headlights, a rod slidable at one end through an opening formed in a bracket plate carried by one of said chassis bars, means for operatively connecting said headlight posts to said sliding rod, and an operative connection between said sliding rod and the usual steering gear connecting rod of the vehicle steering mechanism.

3. In a dirigible headlight construction for motor vehicles, a pair of flat-like rods upon opposite sides of the vehicle radiator connected at their rear ends to the chassis bars of the vehicle and adjacent their forward ends to the usual fender braces of said vehicle, collars formed upon the front ends of said rods for receiving the usual posts of the vehicle headlights, a rod slidable at one end through an opening formed in a bracket plate carried by one of said chassis bars, means for operatively connecting said headlight posts to said sliding rod, an operative connection between said sliding rod and the usual steering gear connecting rod of the vehicle steering mechanism, said first mentioned connecting means comprising a pair of inwardly and rearwardly extending rods operatively connected at their forward ends to said headlight posts, and being downwardly bent at their inner ends for engagement through openings in said sliding rod.

In testimony whereof I affix my signature.

LEWIS A. CASEY.